United States Patent
Miyasaka (10) Patent No.: US 7,815,317 B2
(45) Date of Patent: Oct. 19, 2010

(54) PROJECTOR, DISPLAY IMAGE ADJUSTING METHOD, PROGRAM FOR EXECUTING DISPLAY IMAGE ADJUSTING METHOD, AND RECORDING MEDIUM HAVING RECORDED THEREON PROGRAM

(75) Inventor: Akira Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 886 days.

(21) Appl. No.: 11/687,397

(22) Filed: Mar. 16, 2007

(65) Prior Publication Data

US 2007/0285626 A1 Dec. 13, 2007

(30) Foreign Application Priority Data

Mar. 28, 2006 (JP) .............................. 2006-088152

(51) Int. Cl.
G03B 21/20 (2006.01)
H04N 5/228 (2006.01)
H01L 27/00 (2006.01)

(52) U.S. Cl. .................... 353/85; 348/222.1; 250/208.1

(58) Field of Classification Search .................. 353/69, 353/121, 122, 30, 85; 382/162–167, 173–180, 382/260, 275; 348/222.1, 474, 721; 345/214, 345/640, 647, 619; 250/208.1, 205

See application file for complete search history.

(56) References Cited

U.S. PATENT DOCUMENTS

| 5,253,302 A | * | 10/1993 | Massen ...................... 382/110 |
| 6,538,751 B2 | * | 3/2003 | Ono ............................ 356/614 |
| 2007/0091433 A1 | * | 4/2007 | Garner et al. ................ 359/459 |

FOREIGN PATENT DOCUMENTS

| JP | A 2000-241874 | 9/2000 |
| JP | A 2005-318510 | 11/2005 |

* cited by examiner

Primary Examiner—Que T Le
Assistant Examiner—Jennifer Bennett
(74) Attorney, Agent, or Firm—Oliff & Berridge PLC (57) ABSTRACT

A projector includes an image acquiring unit that acquires an image including the projection image captured by the image-capturing device during image projection, an image region separating unit that separates a projection image region and a background image region from the acquired image, a background image time-lapse change storage unit that stores a time-lapse change of the background image acquired by a background time-lapse change acquiring unit, a projection image time-lapse change storage unit that stores a time-lapse change of the projection image acquired by a projection image time-lapse change acquiring unit, an tendency-of-use judging unit that judges a tendency of use of the projector on the basis of the stored time-lapse change of the background image and the stored time-lapse change of the projection image, and a light quantity adjusting unit that adjusts a light quantity of the light source on the basis of the judgment result.

7 Claims, 4 Drawing Sheets

FIG. 1

Table 1

| INPUT SYSTEM | TOTAL LUMINANCE INTEGRATION VALUE Yt | TOTAL INTEGRATION TIME Tt | LUMINANCE INTEGRATION VALUE Y1 AFTER STARTING | INTEGRATION TIME T1 |
|---|---|---|---|---|
| DVI | ○○○○ | ○○ | ○○○ | ○○ |
| RGB | △△△ | △△ | △△ | △△ |
| S TERMINAL | □□□ | □□ | □□ | □ |

FIG. 2

Table 2

| | TOTAL LUMINANCE INTEGRATION VALUE Yh | TOTAL INTEGRATION TIME Th | LUMINANCE INTEGRATION VALUE Y2 AFTER STARTING | INTEGRATION TIME T2 |
|---|---|---|---|---|
| BACKGROUND IMAGE TIME-LAPSE CHANGE | ○○○○ | ○○ | ○○○ | ○○ |

PROJECTOR, DISPLAY IMAGE ADJUSTING METHOD, PROGRAM FOR EXECUTING DISPLAY IMAGE ADJUSTING METHOD, AND RECORDING MEDIUM HAVING RECORDED THEREON PROGRAM

BACKGROUND

1. Technical Field

The present invention relates to a projector, a display image adjusting method, a program for executing the display image adjusting method, and a recording medium having recorded thereon the program.

2. Related Art

Projectors modulate a light flux emitted from a light source according to an input image signal and project the modulated light flux on a screen on magnified scale. Among the projectors, a so-called front projector that has a screen and a projector to be separately provided is widely used for presentation for business use or a personal home theater.

In such a projector, if a projection lens of the projector is arranged to face the screen, no problem occurs in a projection image. However, if the surface of the screen is inclined with respect to the projector, the projection is inclined, and a keystone distortion occurs in the projection image accordingly.

For this reason, there is known a projector that has a function of correcting the keystone distortion without changing the positional relationship between the projector and the screen.

Further, when the projector and the screen are provided, a distance between the projector and the screen changes according to situations. Accordingly, it is necessary to perform zoom or focus adjustment while viewing an image projected on the screen.

In the related art, generally, an observer of the projector operates the projector so as to perform such a keystone distortion correction or focus adjustment. In order to automize the above-described functions, there is suggested a projector that has an image-capturing device, such as a CCD (Charge-Coupled Device) camera thereon and automatically performs the keystone distortion correction and the zoom and focus adjustment on the basis of an image captured by the image-capturing device (for example, see JP-A-2000-241874 and JP-A-2005-318510).

However, in the above-described projector that can automatically perform the keystone distortion correction and the zoom and focus adjustment, the image-capturing device operates only when the projector is initially installed. Meanwhile, after an image is protected, the image-capturing device does not operate. In particular, in the case of a fixed projector, if the projector is set once, the projector seldom moves. Accordingly, since the mounted image-capturing device does not operate after the installment, the image-capturing device becomes useless.

Meanwhile, in an image display device including such a projector, it is necessary to reduce power consumption in a view of energy conservation.

SUMMARY

An advantage of some aspects of the invention is that it provides a projector that includes an image-capturing device for automatically adjusting a projection image upon installment so as to effectively use the image-capturing device while an image is projected and to realize energy conservation, a display image adjusting method, a program for executing the display image adjusting method, and a recording medium having recorded thereon the program.

According to an aspect of the invention, a projector includes a light source, a light modulation device that modulates a light flux emitted from the light source on the basis of an input image signal so as to form an optical image, a projective optical device that projects the optical image formed by the light modulation device on magnified scale, an image-capturing device that captures the projection image projected on magnified scale and automatically adjusts the projection image upon installment, an image acquiring unit that acquires an image including the projection image captured by the image-capturing device during image projection, an image region separating unit that separates a projection image region and a background image region from the acquired image, a background image time-lapse change acquiring unit that acquires a time-lapse change of a background image in the separated background image region, a background image time-lapse change storage unit that stores the acquired time-lapse change of the background image; a projection image time-lapse change acquiring unit that acquires a time-lapse change of the projection image displayed on the projection image region, a projection image time-lapse change storage unit that stores the acquired time-lapse change of the projection image, a tendency-of-use judging unit that judges a tendency of use of the projector on the basis of the stored time-lapse change of the background image and the stored time-lapse change of the projection image, and a light quantity adjusting unit that adjusts a light quantity of the light source on the basis of the judgment result.

Here, the image-capturing device for automatic adjustment may be incorporated into the projector. Further, a separate image-capturing device may be connected to a USB terminal or the like provided in the projector through a cable.

Further, as regards the judgment of the tendency of use of the projector, the time-lapse change of the projection image is used to judge which image an observer trends to observe. For example, if the observer has a distinct tendency to cause the projector to display a motion picture, such as a movie, a bright image is seldom displayed. Accordingly, it can be judged that the light quantity of the light source may decrease. Otherwise, if the observer has a distinct tendency to cause the projector to display a presentation image of a computer, it can be judged that the light quantity should be maximized.

Meanwhile, as regards the judgment of the tendency of use of the projector, the time-lapse change of the background image is used to judge the installment state of the projector. For example, in the case of a home theater, when the projector is often used at a comparatively dark place, it can be judged that the light quantity of the light source may decrease. Otherwise, when the projector is often used at a bright place, such as a conference room, it can be judged that the light quantity may be increased.

Further, the time-lapse changes of the projection image and the background image may be stored as data per unit time obtained by integrating luminance or illuminance of the entire screen of the acquired image.

In addition, as regards the storage of the time-lapse changes, all time-lapse changes from when the projector starts to be used and a time-lapse change for a predetermined time during image projection may be stored. Then, the tendency of use of the projector may be judged by appropriately weighting both changes.

According to the aspect of the invention, the adjustment of the light quantity is performed through the judgment of the tendency of use of the projector on the basis of the stored time-lapse changes of the projection image and the background image. Accordingly, an observer can observe the projection image with an appropriate light quantity of the light source according to the tendency of the projection image to be displayed by the projector or the installment environment of the projector. Therefore, power consumption of the light source can be suppressed to the minimum, and thus energy conservation can be realized.

Further, with the adjustment of the light quantity, the load of the light source can be reduced, thereby improving lifespan of the light source. Further, the load of the light modulation device, such as a liquid crystal panel, due to illumination light of the light source may be reduced, thereby improving lifespan of the light modulation device. Therefore, lifespan of the projector can be improved.

According to the aspect of the invention, the time-lapse change of the projection image may be acquired by the projection image time-lapse change acquiring unit using the following two methods.

(1) The time-lapse change of the projection image may be acquired on the basis of the image of the projection image region separated by the image region separating unit. That is, the time-lapse change of the projection image may be acquired from the projection image region captured by the image-capturing device.

(2) The time-lapse change of the projection image may be acquired on the basis of image data per frame that is stored in the frame buffer of the projector of the projector.

In the case of the method (1), since the time-lapse change of the projection image can be acquired using the same process as the process of acquiring the time-lapse change of the background image, the process can be simplified.

Meanwhile, in the case of the method (2), the time-lapse change of the projection image may be acquired on the basis of an actually input image signal, not the image acquired by the image-capturing device. Accordingly, an accurate time-lapse change of the protection image according to the input image signal can be acquired. Further, if the input image signal is an mage signal, for example, of an MPEG2 format, the characteristic of the image signal can be acquired using meta data accompanied with the image signal. Accordingly, a more preferable light quantity adjustment can be realized.

According to the aspect of the invention, the projector may include a plurality of input systems to which image signals having different formats are input. In this case, the projection image time-lapse change acquiring unit may secure a region where the time-lapse change of the projection image according to each input system is stored.

Here, the input system to which the image signal is input may be a component terminal or a separate image terminal, for example, an RGB terminal or a DVI (Digital Visual Interface) terminal, to which a PC is connected, or an S terminal, to which a video player, such as a DVD (Digital Versatile Disc) player is connected.

According to the aspect of the invention, in the case of the S terminal, since there are many cases where an image signal relates to a motion picture, such as a movie, the tendency of the motion picture including the preference of the observer can be acquired as the tendency of use by acquiring the time-lapse change at the input system. Accordingly, the accuracy of the light quantity adjustment can be improved through the light quantity adjustment with the preference of the observer.

According to the aspect of the invention, the projector may further include an image signal monitoring unit that monitors the input of the image signal. The light quantity adjusting unit may adjust the light quantity of the light source when the image signal monitoring unit judges that the input of the image signal stops.

Here, the input of the image signal may be monitored by monitoring the state of a signal input to an image signal input terminal. Alternatively, the image of the projection image region captured by the image-capturing device may be monitored, and it may be judged that the image signal input stops when a predetermined monochrome color, for example, blue appears.

According to the aspect of the invention, in a state where the image signal input stops, it is not necessary to display the projection image using a large amount of light. In this case, it is possible to promote energy conservation by reducing luminance of the projection image through the light quantity adjustment.

According to another aspect of the invention, there is also provided a display image adjusting method in a projector having an image-capturing device for automatic adjustment. Further, according to other aspects of the invention, there are also provided a program for executing individual steps of the display image adjusting method on a computer and a computer-readable recording medium having recorded thereon the program.

Specifically, according to another aspect of the invention, there is provided a display image adjusting method of a projector that includes, in an apparatus main body, a light source, a light modulation device modulating a light flux emitted from the light source on the basis of an input image signal so as to form an optical image, and a projective optical device projecting the optical image formed by the light modulation device on magnified scale, an image-capturing device capturing the projection image projected on magnified scale and automatically adjusting the projection image upon installment, and a control unit controlling the apparatus main body on the basis of image-capturing data by the image-capturing device, the control unit adjusting an image to be displayed. The display image adjusting method causes the control unit to execute acquiring an image including the projection image captured by the image-capturing device while displaying a projection image, separating a projection image region and a background image region from the acquired image, acquiring and storing a time-lapse change of a background image in the separated background image region, acquiring and storing a time-lapse change of the projection image displayed on the projection image region, and judging a tendency of use of the projector on the basis of the stored time-lapse change of the background image and the stored time-lapse change of the projection image, and adjusting a light quantity of the light source on the basis of the judgment result.

According to another aspect of the invention, the same advantages and effects as those described above can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

Figure 1:
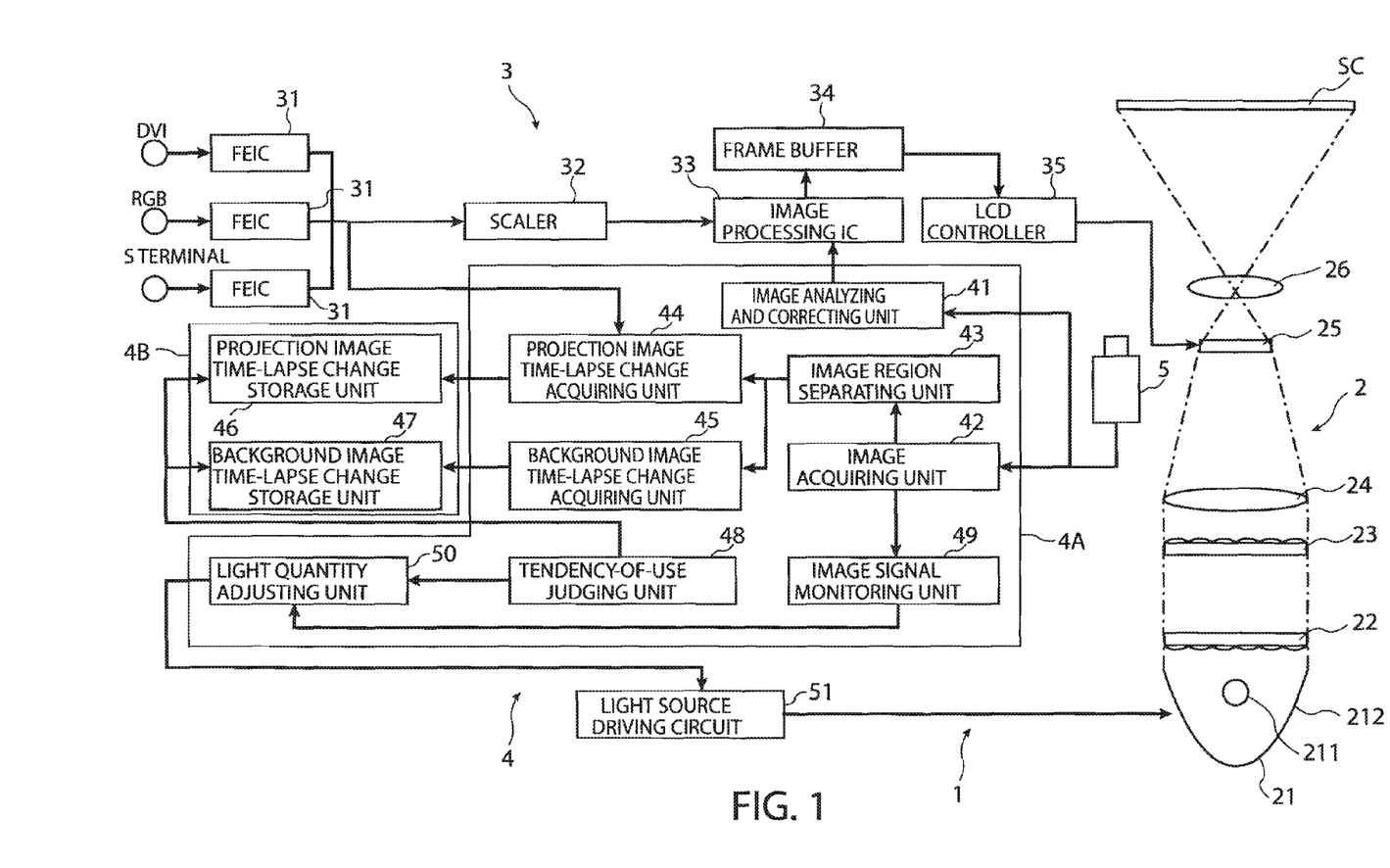
FIG. 1 is a block diagram showing the structure of a projector according to a first embodiment of the invention.

FIG. 1 shows a projector 1 according to a first embodiment of the invention. The projector 1 includes an optical system 2, an image processing system 3, and a control system 4. The projector 1 is an optical apparatus that processes image signals input from input terminals DVI and RGB and an S terminal by the image processing system 3, forms an optical image on the basis of the processing result by the optical system 2, and projects an image on a screen SC on magnified scale.

1. Configuration of Optical System 2

The optical system 2 includes a light source device 21, lens arrays 22 and 23, a condensing lens 24, a liquid crystal panel 25, and a projection lens 26. Though not shown in FIG. 1, the optical system 2 according to this embodiment includes three liquid crystal panels 25 so as to modulate and synthesize red, green, and blue light components according to the image signals, and form a color image. To this end, a color separating optical system is provided in front of the liquid crystal panel 25 to separate the light flux emitted from the light source device 21 into three colors of RGB. Further, a color synthesizing optical system is provided at the back of each of the liquid crystal panels 25 and in front of the projection lens 26 to synthesize the color light components.

The light source device 21 includes a discharge light-emission tube 211, such as an ultrahigh pressure mercury ramp, and a reflector 212. The direction of the light flux emitted from the discharge light-emission tube 211 is arranged by the reflector 212 and then emitted.

Each of the lens arrays 22 and 23 has a plurality of small lenses that are arranged in a matrix shape in plan view. The lens array 22 disposed close to the light source functions as an optical element that divides illumination light from the light source device 21 into a plurality of partial light fluxes. Further, the lens array 23 functions as an optical element that superimposes the partial light fluxes on an image forming region of the liquid crystal panel 25, together with the condensing lens 24 at the back of the lens array 23.

The liquid crystal panel 25 is a fixed pixel type image generating device. The liquid crystal panel 25 includes a plurality of fixed pixels that are planarly disposed on the image forming region. Though not shown in FIG. 1, each of the fixed pixels has a TFT (Thin Film Transistor), as a switching element, which applies a voltage to liquid crystal interposed between a pair of transparent substrates. A voltage to be applied to each pixel changes through switching of the TFT, and the alignment state of liquid crystal changes. Then, the incident light flux can be modulated according to input image data.

The projection lens 26 is an optical element that projects the optical image formed by the liquid crystal panel 25 on magnified scale. For example, the projection lens 26 has a lens group in which a plurality of lenses are incorporated into a lens tube.

2. Configuration of Image Processing System 3

The image processing system 3 includes front end ICs 31 provided to correspond to the input terminals DVI and RGB and the S terminal, a scaler 32, an image processing IC 33, a frame buffer 34, and an LCD controller 35.

A computer is connected to the input terminals DVI and RGB, through which image signals are input from the computer. Meanwhile, a DVD player or a video player is connected to the S terminal, through which image signals related to a motion picture played by such players are input.

The front end ICs 31 convert the analog image signals output from the devices connected to the input terminals DVI and RGB and the S terminal into digital image signals.

The scaler 32 converts resolution of the input image signal to resolution capable of being displayed on the liquid crystal panel 25.

The image processing IC 33 performs a plurality of image processing on the image signal whose resolution is converted by the scaler 32 and displays a high quality image on the liquid crystal panel 25. In particular, the image processing IC 33 performs a luminance irregularity correction, a color irregularity correction, and a V-Tγ correction with respect to each of the pixels of the liquid crystal panel 25 and writes the image signal after the processing in the frame buffer 34.

The frame buffer 34 stores and holds the image signal supplied from the image processing IC 33 in serial per frame. If images for one frame are stored in the frame buffer 34, the images are output to the LCD controller 35.

The LCD controller 35 controls driving of the liquid crystal panel 25 on the basis of the image signal stored and held in the frame buffer 34. That is, the LCD controller 35 controls driving of the liquid crystal panel 25 on the basis of the image signal per frame stored and held in the frame buffer 34.

In the image processing system 3, an image signal input to one of the input terminals DVI and RGB and the S terminal is converted into a digital signal by the corresponding front end IC 31, then resolution thereof is converted by the scaler 32, and subsequently the converted signal is subject to the image processing by the image processing IC 33. Thereafter, the LCD controller 35 controls driving of the liquid crystal panel 25 so as to form a protection image on the screen SC.

3. Configuration of Control System 4

The control system 4 that functions as a control unit performs various processing on the basis of the image including the projection image captured by the image-capturing device 5, such as a CCD or the like. The control system 4 includes an arithmetic processing device 4A and a storage unit 4B.

The arithmetic processing device 4A includes an image analyzing and correcting unit 41, an image acquiring unit 42, an image region separating unit 43, a projection image time-lapse change acquiring unit 44, a background image time-lapse change acquiring unit 45, a projection image time-lapse change storage unit 46, a background image time-lapse change storage unit 47, a tendency-of-use judging unit 48, an image signal monitoring unit 49, and a light quantity adjusting unit 50. The individual functional units function as a program to be executed on the arithmetic processing device 4A.

The image analyzing and correcting unit 41 analyzes the projection image captured by the image-capturing device 5, generates the amount of correction, and outputs the amount of correction to the image processing IC 33 so as to perform a keystone distortion correction and zoom/focus correction For example, in the case of the keystone distortion correction, the image analyzing and correcting unit 41 acquires edges of the projection image region from data, such as luminance distribution, and grasps a distortion state of the projection image on the basis of an image including the projection image captured by the image-capturing device Next, the image analyzing and correcting unit 41 generates correction data for an inverse conversion of the projection image on the basis of the acquired distortion state of the projection image. In particular, when the projection image captured by the image-capturing device 5 has a trapezoidal shape having a long upper side and a short lower side, the image analyzing and correcting unit 41 generates correction data to make the lower side long and the upper side short and outputs the correction data to the image processing IC 33. The image processing IC 33 compresses a display region of the image signal on the basis of the correction data and writes the compressed image signal in the frame buffer 34.

The image acquiring unit 42 acquires the image including the projection image captured by the image-capturing device 5 while the projector 1 projects an image. In the acquired image, an approximately center becomes a projection image region and the vicinity of the center becomes a background image in a frame shape. The acquisition of the image by the image acquiring unit 42 is performed by a predetermined time interval. For example, the acquisition of the image is performed once a minute.

The image region separating unit 43 separates the image acquired by the image acquiring unit 42 into a projection image region and a background image region. The image region separating unit 43 separates the image on the basis of the edges of the projection image region, like the above-described image analyzing and correcting unit 41.

The projection image time-lapse change acquiring unit 44 acquires, for example, a luminance value of the entire image for the image of the projection image region acquired by the image acquiring unit 42 by one minute time interval and separated by the image region separating unit 43. Further, the protection image time-lapse change acquiring unit 44 stores the luminance value in the projection image time-lapse change storage unit 46, together with a time elapsed after the projector I starts. When storing the time-lapse change in the projection image time-lapse change storage unit 46, the projection image time-lapse change acquiring unit 44 checks whether or not an image signal is input from one of the input terminals DVI and RGB and the S terminal and stores the input image signal in a region of the input system set by the projection image time-lapse change storage unit 46 according to the input system.

Figure 2:
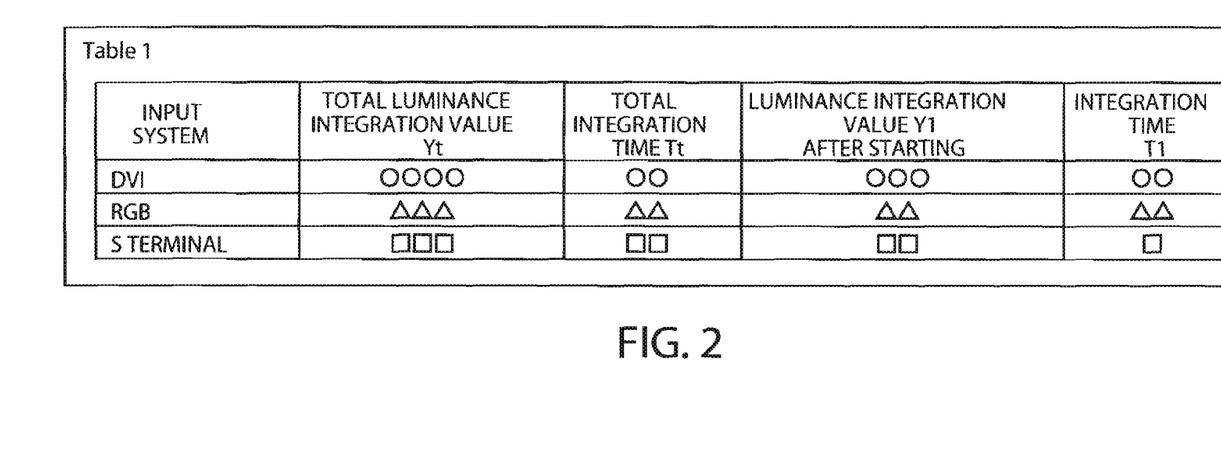
FIG. 2 is a schematic view showing the structure of a projection image time-lapse change acquiring unit according to the first embodiment of the invention.

Here, the projection image time-lapse change storage unit 46 is secured in a storage region of a rewritable nonvolatile memory, such as an EEPROM or the like. As shown in FIG. 2, the projection image time-lapse change storage unit 46 has a table 1 in which a total luminance integration value Yt, a total integration time Tt, a luminance integration value Y1 after starting, and an integration time T1 are written according to the input terminals DVI and RGB and the S terminal. The total luminance integration value Yt and the total integration time Tt are obtained by integrating a total luminance value and an activation time after the projector 1 initially starts, respectively. Further, the luminance integration value Y1 after starting and the integration time T1 are obtained by integrating a total luminance value and an activation operation time when the projector 1 starts, respectively.

Like the projection image time-lapse change acquiring unit 44, the background image time-lapse change acquiring unit 45 acquires a luminance value of the entire image for the image of the background image region separated by the image region separating unit 43. Then, the background image time-lapse change acquiring unit 45 stores the luminance value in the background image time-lapse change storage unit 47, together with the time elapsed after the projector 1 starts.

Figure 3:
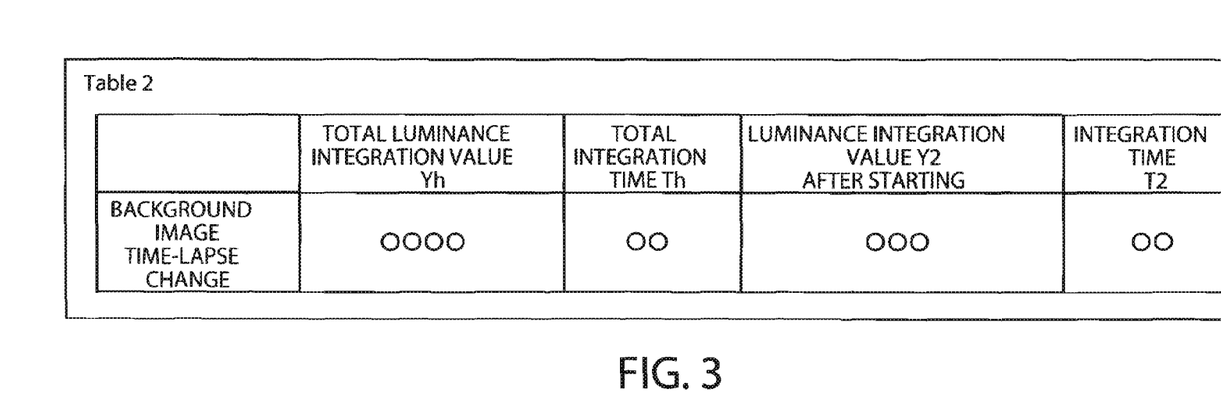
FIG. 3 is a schematic view showing the structure of a background image time-lapse change acquiring unit according to the first embodiment of the invention.

The background image time-lapse change storage unit 47 is secured in a storage region of a rewritable nonvolatile memory, such as an EEPROM or the like. As shown in FIG. 3, the background image time-lapse change storage unit 47 has a table 2 in which a total luminance integration value Yh, a total integration time Th, a luminance integration value Y2 after starting; and an integration time T2 of the background image region are written. In the table 2, the values obtained by integrating the total luminance value and the activation time after the projector 1 initially starts and the total luminance value and the activation time when the projector 1 starts are written.

The tendency-of-use judging unit 48 judges the tendency of use of the projector 1 on the basis of the time-lapse change of the projection image and the time-lapse change of the background image stored in the projection image time-lapse change storage unit 46 and the background image time-lapse change storage unit 47, respectively. Specifically, the tendency-of-use judging unit 48 judges at which brightness the observer causes an image to be displayed on the basis of the luminance value of the image to be displayed per unit time according to information of the total luminance value and integration time stored in the projection image time-lapse change storage unit 46.

At this time, the tendency-of-use judging unit 48 judges the tendency of the image to be displayed by the projector 1 by performing appropriate weighting after starting on the basis of the luminance value per unit time obtained from the total luminance integration value Yt and the total integration time Tt in the projection image time-lapse change storage unit 46 and on the basis of the luminance value per unit time obtained from the total luminance value Y1 and the integration time T1 after the projector 1 starts.

Further, the tendency-of-use judging unit 48 calculates, as the luminance value per unit time, the time-lapse change of the background image stored in the background image time-lapse change storage unit 47 so as to grasp the environment of use of the projector 1.

Furthermore, the tendency-of-use judging unit 48 acquires a difference between the total luminance value per unit time that causes the time-lapse change of the projection image and the total luminance value per unit time that causes the time-lapse change of the background image, so as to output the judgment result with the image to be projected and the installment environment of the projector 1 to the light quantity adjusting unit 50.

The image signal monitoring unit 49 monitors the image displayed on the projection image display region in the image including the projection image acquired by the image acquiring unit 42. When the image is a predetermined monochrome image and does not change even though a predetermined time elapses, the image signal monitoring unit 49 judges that the input of the image signal to the projector 1 stops. Then, the image signal monitoring unit 49 generates a light quantity adjustment signal to decrease the light quantity and outputs the light quantity adjustment signal to the light quantity adjusting unit 50.

The light quantity adjusting unit 50 sets the light quantity of the light source device 21 on the basis of the judgment result of the tendency-of-use judging unit 48 and the monitoring result of the image signal monitoring unit 49. For example, if it is judged that the background image is sufficiently dark and the projection image includes a lot of comparatively dark images such as a motion picture, the light quantity adjusting unit 50 generates a light quantity control signal to decrease the light quantity of the light source device 21 and outputs the light quantity control signal to a light source driving circuit 51. The light source driving circuit 51 controls power to be supplied to the light source device 21 on the basis of the light quantity control signal from the light quantity adjusting unit 50 so as to adjust the light quantity of the light source device 21.

4. Operation of Projector 1

Figure 4:
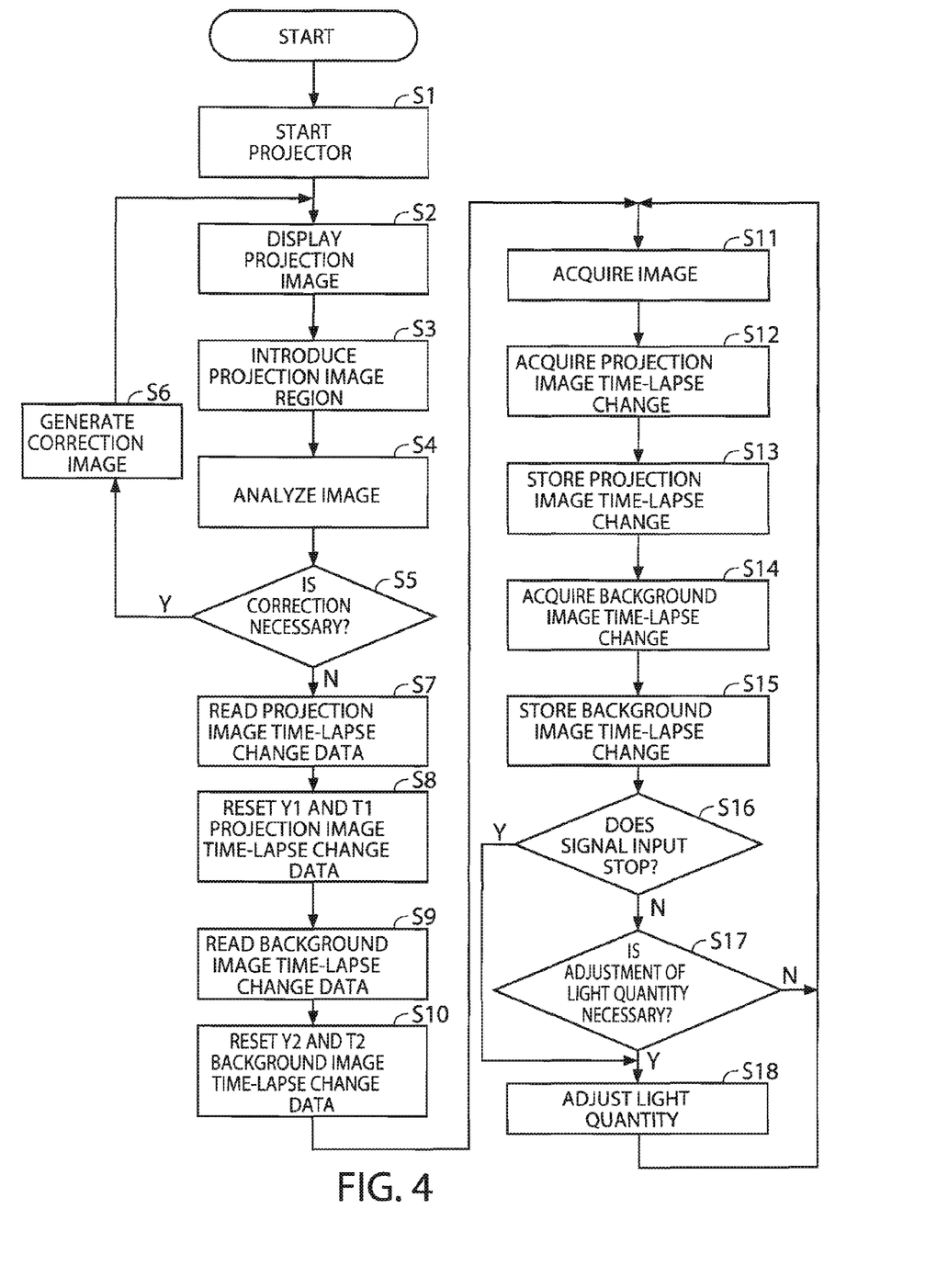
FIG. 4 is a flowchart illustrating the operation of the first embodiment of the invention.

Next, the operation of the above-described projector 1 will be described with reference to a flowchart shown in FIG. 4.

First, if the projector 1 starts (Step S1), a projection image as an initial screen is displayed on the screen SC (Step S2). The image analyzing and correcting unit 41 of the control system 4 introduces an image including the projection image displayed on the screen SC through the image-capturing device 5 (Step S3).

The image analyzing and correcting unit 41 analyzes the image (Step S4), acquires the edges of the projection image region, and judges whether to perform the keystone distortion correction on the basis of the shapes of the edges (Step S55) if it is judged that the correction should be performed, the image analyzing and correcting unit 41 generates a correction image (Step S6), displays the correction image as the projection image, and repeats the above-described steps until the correction does not need to be performed Next, if a desired rectangular image is displayed on the screen SC, the projection image time-lapse change acquiring unit 44 reads out time-lapse change data of the projection image stored in the projection image time-lapse change storage unit 46 according to the signal input terminals DVI and RGB and the S terminal, and holds the read time-lapse change data of the projection image in, for example, a working RAM (Step S7) Simultaneously, the projection image time-lapse change acquiring unit 44 resets the time-lapse change data Y1 after starting and the integration time T1 in the time-lapse change data (Step S8).

Further, in the same manner, the background image time-lapse change acquiring unit 45 reads out time-lapse change data of the background image, and holds the read time-lapse change data of the background image in the working RAM (Step S9). Simultaneously, the background image time-lapse change acquiring unit 45 resets the time-lapse change data Y2 after starting and the integration time T2 (Step S10).

While the projector 1 projects the image, the image acquiring unit 42 introduces the image including the projection image through the image-capturing device 5 (Step S11). Then, after the image region separating unit 43 separates the projection image region and the background image region, the projection image time-lapse change acquiring unit 44 acquires the luminance value of the protection image region and integrates the acquired luminance value to the luminance values Yt and Y1 of the time-lapse change data. Simultaneously, the projection image time-lapse change acquiring unit 44 integrates the time elapsed at that time to the integration time Tt and T1 (Step S12). Then, the projection image time-lapse change acquiring unit 44 writes the data in the projection image time-lapse change storage unit 46 (Step S13).

Subsequently, the background image time-lapse change acquiring unit 45 acquires luminance value data of the background image region and integrates the luminance value data to the luminance values Yh and Y2 of the time-lapse change data. Further, the background image time-lapse change acquiring unit 45 integrates the time elapsed at that time to the integration time Th and T2 (Step S14). Then, the background image time-lapse change acquiring unit 45 writes the data in the background image time-lapse change storage unit 47 (Step S15).

While the projection image and background image are introduced the image signal monitoring unit 49 monitors the projection image so as to judge whether the monochrome image is held for a predetermined time and the signal input does not stop (Step S16). If it is judged that the signal input stops, the image signal monitoring unit 49 outputs a signal to decrease the light quantity, such that the light quantity adjusting unit 50 adjusts the light quantity of the light source device 21.

If it is judged that the signal input does not stop, the tendency-of-use judging unit 48 judges whether to adjust the light quantity on the basis of the time-lapse change data of the protection image and the time-lapse change data of the background image acquired in advance (Step S17).

If it is judged that the light quantity should be adjusted, the tendency-of-use judging unit 48 outputs the judgment result to the light quantity adjusting unit 50. The light quantity adjusting unit 50 controls driving of the light source driving circuit 51 so as to adjust the light quantity of the light source device 21 on the basis of the judgment result (Step S18). Thereafter, the process returns to Step S11 and the above-described steps are repeated.

Meanwhile, if it is judged that the light quantity adjustment is not needed, the process returns to Step S11 and the above-described steps are repeated.

Since the light quantity is adjusted through the above-described steps, when it is not necessary to increase the light quantity, it is possible to decrease the light quantity according to the projection image and environment condition. Accordingly, energy conservation of the projector 1 can be realized.

Second Embodiment

Next, a second embodiment of the invention will be described. Hereinafter, the same parts as those described above are represented by the same reference numerals, and the descriptions thereof will be omitted.

In the first embodiment, the projection image time-lapse change acquiring unit 44 acquires the time-lapse change data of the projection image on the basis of the projection image region separated by the image region separating unit 43 in the image captured by the image-capturing device 5.

Figure 5:
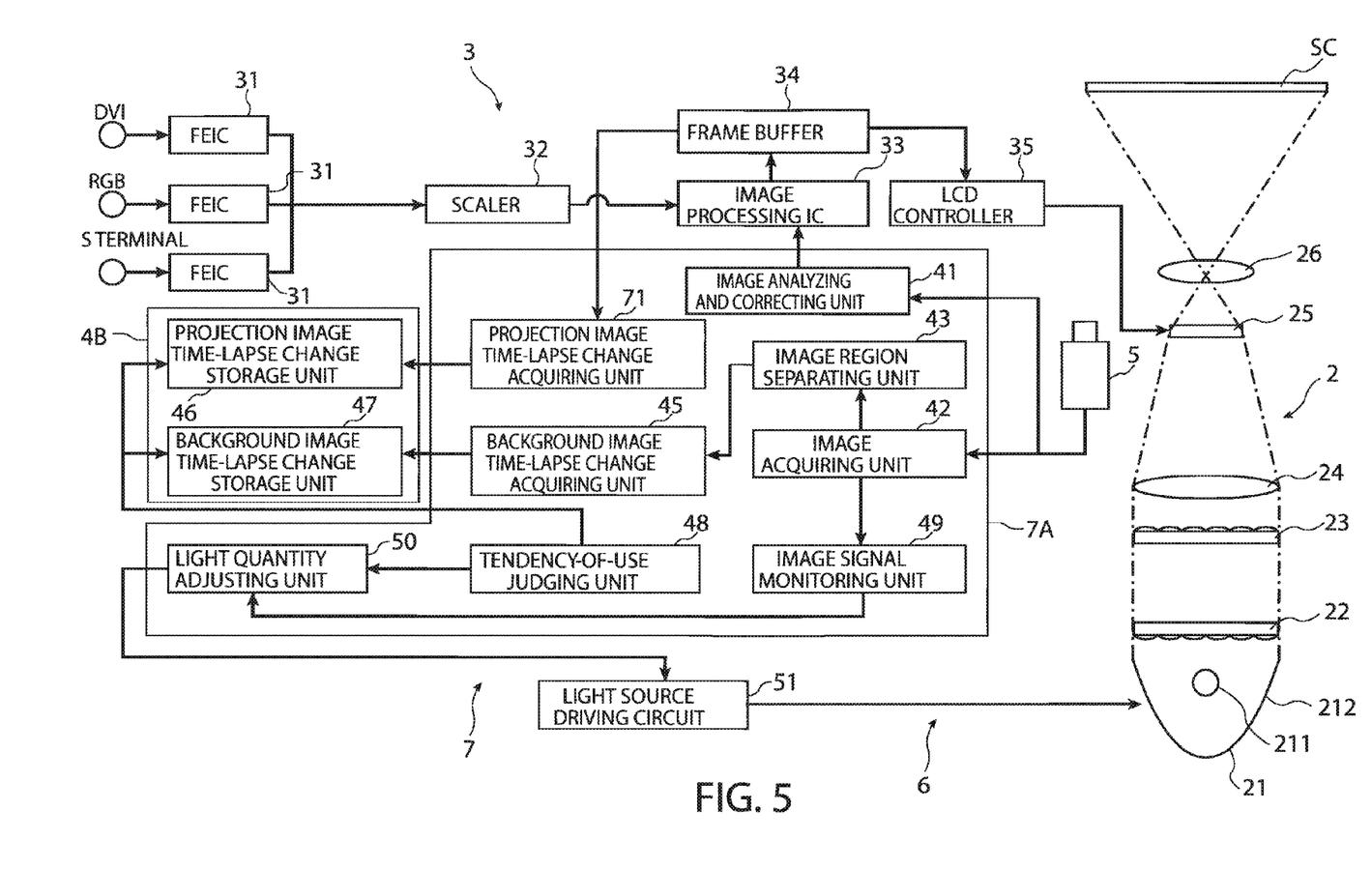
FIG. 5 is a block diagram showing the structure of a projector according to a second embodiment of the invention.

Meanwhile, as shown in FIG. 5, a projector 6 according to the second embodiment is different from the projector 1 according to the first embodiment in that a projection image time-lapse change acquiring unit 71 as a program to be executed on an arithmetic processing device 7A of the control system 7 acquires time-lapse change data on the basis of data written in the frame buffer 34 of the image processing system 3.

That is, the projection image time-lapse change acquiring unit 71 acquires the time-lapse change of the projection image with reference to an image signal providing a projection image written in the frame buffer 34, instead of the image data of the projection image region captured by the image-capturing device 5. Data reading from the frame buffer 34 does not need to be performed for every frame. For example, it is preferable that the data be acquired as the time-lapse change of the projection image through reading of third to tenth frames at once. At this time, the projection image time-lapse change acquiring unit 71 calculates a luminance integration value in the frame and also acquires the integration time. Then, the projection image time-lapse change acquiring unit 71 stores the luminance integration value and the integration time in the projection image time-lapse change storage unit 46.

As described above, in the second embodiment of the invention, the time-lapse change of the projection image is directly acquired from the input image signal. Therefore, a more accurate time-lapse change of the projection image can be acquired compared with the first embodiment.

MODIFICATIONS

The invention is not limited to the above-described embodiments, but various modification and improvements can be made within the scope in which the advantages of the invention can be achieved.

In the first embodiment of the invention, the image-capturing device 5 and the control system 4 are mounted on the projector 1. However, the invention is not limited thereto. The image-capturing device 5 and the control system 4 may control the light quantity of the projector 1 while being separated from the projector 1. That is, the projector 1 may be connected to the control system through a separate connection terminal, such as an USB, capable of interactive communication, thereby controlling the light quantity of the projector 1. Accordingly, the same advantages and effects as the invention can be obtained by connecting the image-capturing device and the units of the control system to a general-use projector, and generality can be improved.

Further, in the second embodiment of the invention, the time-lapse change of the projection image is acquired from the image signal in the frame buffer, but the invention is not limited thereto. For example, in the case of an MPEG2, when predetermined header information is attached to a GOP or the like and the characteristic of the projection image is read therefrom, the time-lapse change of the projection image can be acquired using the header information.

Furthermore, in the first embodiment, the image signal monitoring unit 49 judges whether the input of the image signal stops on the basis of the projection image introduced by the image acquiring unit 42, but the invention is not limited thereto. For example, the projector 1 may include an image signal monitoring unit so as to judge whether the input of the image signal stops directly from the input terminal.

Besides, as for the specific structure and shape upon the execution of the invention, other structures may be used within the scope capable of achieving the advantages of the invention.

What is claimed is:

1. A projector comprising:
   a light source;
   a light modulation device that modulates a light flux emitted from the light source on the basis of an input image signal so as to form an optical image;
   a projective optical device that projects the optical image formed by the light modulation device on magnified scale;
   an image-capturing device that captures the projection image projected on magnified scale and automatically adjusts the projection image upon installment;
   an image acquiring unit that acquires an image including the projection image captured by the image-capturing device during image projection;
   an image region separating unit that separates a projection image region and a background image region from the acquired image;
   a background image time-lapse change acquiring unit that acquires a time-lapse change of a background image in the separated background image region;
   a background image time-lapse change storage unit that stores the acquired time-lapse change of the background image;
   a projection image time-lapse change acquiring unit that acquires a time-lapse change of the projection image displayed on the projection image region;
   a projection image time-lapse change storage unit that stores the acquired time-lapse change of the projection image;
   an tendency-of-use judging unit that judges a tendency of use of the projector on the basis of the stored time-lapse change of the background image and the stored time-lapse change of the projection image; and
   a light quantity adjusting unit that adjusts a light quantity of the light source on the basis of the judgment result.

2. The projector according to claim 1,
   wherein the projection image time-lapse change acquiring unit acquires the time-lapse change of the projection image on the basis of the image of the projection image region separated by the image region separating unit.

3. The projector according to claim 1, further comprising:
   a frame buffer that stores and holds the input image signal as image data per frame,
   wherein the projection image time-lapse change acquiring unit acquires the time-lapse change of the projection image on the basis of the image data per frame that is held in the frame buffer.

4. The projector according to claim 1, further comprising:
   a plurality of input systems to which image signals having different formats are input,
   wherein the projection image time-lapse change storage unit secures a region for storing the time-lapse change of the projection image according to each input system.

5. The projector according to claim 1, further comprising:
   an image signal monitoring unit that monitors the input of the image signal,
   wherein the light quantity adjusting unit adjusts the light quantity of the light source when the image signal monitoring unit judges that the input of the image signal stops.

6. A display image adjusting method of a projector that includes, in an apparatus main body, a light source, a light modulation device modulating a light flux emitted from the light source on the basis of an input image signal so as to form an optical image, and a projective optical device projecting the optical image formed by the light modulation device on magnified scale, an image-capturing device capturing the projection image projected on magnified scale and automatically adjusting the projection image upon installment, and a control unit controlling the apparatus main body on the basis of image-capturing data by the image-capturing device, the control unit adjusting an image to be displayed, the display image adjusting method causing the control unit to execute:
   acquiring an image including the projection image captured by the image-capturing device during displaying a projection image;
   separating a projection image region and a background image region from the acquired image;
   acquiring and storing a time-lapse change of a background image in the separated background image region;
   acquiring and storing a time-lapse change of the projection image displayed on the projection image region; and
   judging the tendency of use of the projector on the basis of the stored time-lapse change of the background image and the stored time-lapse change of the projection image; and
   adjusting a light quantity of the light source on the basis of the judgment result.

7. A non-transitory computer readable medium storing a program to be executed on the control unit to perform the display image adjusting method according to claim 6.

* * * * *